United States Patent
Khojastepour et al.

(10) Patent No.: US 11,379,676 B2
(45) Date of Patent: Jul. 5, 2022

(54) RFID-BASED SELF-CHECKOUT SYSTEMS USING CYCLE COUNTING

(71) Applicant: NEC Laboratories America, Inc., Princeton, NJ (US)

(72) Inventors: Mohammad Khojastepour, Lawrenceville, NJ (US); Mustafa Arslan, Princeton, NJ (US); Sampath Rangarajan, Bridgewater, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/219,948

(22) Filed: Apr. 1, 2021

(65) Prior Publication Data

US 2021/0312146 A1    Oct. 7, 2021

Related U.S. Application Data

(60) Provisional application No. 63/003,363, filed on Apr. 1, 2020.

(51) Int. Cl.
*H04Q 5/22* (2006.01)
*G06K 7/10* (2006.01)
*G06K 19/07* (2006.01)

(52) U.S. Cl.
CPC ..... *G06K 7/10356* (2013.01); *G06K 7/10029* (2013.01); *G06K 7/10405* (2013.01); *G06K 19/0723* (2013.01)

(58) Field of Classification Search
CPC ........... G06K 7/10356; G06K 7/10029; G06K 7/10405; G06K 19/0723
See application file for complete search history.

(56) References Cited

U.S. PATENT DOCUMENTS

| | | | | |
|---|---|---|---|---|
| 5,530,702 A | * | 6/1996 | Palmer | G06K 7/0008 340/10.2 |
| 5,745,036 A | * | 4/1998 | Clare | G08B 13/2448 340/572.1 |
| 5,920,261 A | * | 7/1999 | Hughes | G06K 7/0008 342/146 |
| 6,883,710 B2 | * | 4/2005 | Chung | G08B 13/2474 235/383 |
| 7,183,995 B2 | * | 2/2007 | Pleva | G01S 7/352 342/374 |
| 7,986,235 B2 | * | 7/2011 | Posamentier | G06K 7/10475 340/572.1 |
| 7,997,486 B2 | * | 8/2011 | Ulrich | G06Q 20/208 902/22 |

(Continued)

OTHER PUBLICATIONS

Brian Truman, RFID Item-Level Tagging in a Grocery Store Environment (Year: 2019).*

(Continued)

*Primary Examiner* — Quang Pham
(74) *Attorney, Agent, or Firm* — Joseph Kolodka

(57) ABSTRACT

A method for employing cycle counting is presented. The method includes interrogating, by an RFID reader, RFID tags by using a plurality of antenna ports, determining, by an activation sequencer, an activation sequence of the plurality of antenna ports that have been enabled, collecting RFID tag responses from each of the RFID tags, and matching one or more of the RFID tag responses to a particular antenna port of the plurality of antenna ports in an activation cycle.

20 Claims, 6 Drawing Sheets

(56) References Cited

U.S. PATENT DOCUMENTS

| | | | |
|---|---|---|---|
| 8,006,904 B2* | 8/2011 | Salim | G07G 1/009 235/487 |
| 8,079,515 B2 | 12/2011 | Kocznar et al. | |
| 8,212,678 B2* | 7/2012 | Scherabon | H04B 7/10 340/10.2 |
| 8,487,747 B2* | 7/2013 | Morin | G06K 7/0008 340/995.13 |
| 8,742,930 B2* | 6/2014 | Hong | G08B 13/248 340/572.2 |
| 9,243,449 B1 | 1/2016 | Ziemkowski et al. | |
| 9,959,439 B1* | 5/2018 | Lui | G06Q 10/0833 |
| 11,132,737 B2* | 9/2021 | Glaser | G06Q 40/12 |
| 11,205,168 B2* | 12/2021 | DeLuca | G06Q 20/202 |
| 2002/0075152 A1* | 6/2002 | Nysen | G06K 17/0022 340/572.1 |
| 2003/0231105 A1* | 12/2003 | Kim | G06K 7/0008 340/10.2 |
| 2005/0212673 A1* | 9/2005 | Forster | G06K 7/10336 375/147 |
| 2005/0219050 A1* | 10/2005 | Martin | G01R 31/67 340/572.1 |
| 2006/0165039 A1* | 7/2006 | Lyon | G06F 15/173 370/334 |
| 2006/0215026 A1* | 9/2006 | Kamata | H04M 1/72463 348/143 |
| 2007/0046434 A1* | 3/2007 | Chakraborty | G06K 7/10356 340/10.1 |
| 2007/0139163 A1* | 6/2007 | Powell | G06K 7/10356 340/10.2 |
| 2007/0164850 A1* | 7/2007 | Spindler | G06K 7/10297 340/10.2 |
| 2008/0040246 A1* | 2/2008 | Fukamachi | B65G 1/1373 705/29 |
| 2008/0111662 A1* | 5/2008 | Sakama | G06K 7/10178 340/10.1 |
| 2008/0129454 A1* | 6/2008 | Chen | G06K 7/0008 340/572.1 |
| 2008/0231448 A1* | 9/2008 | Fowler | G08B 13/2462 340/572.1 |
| 2009/0032585 A1 | 2/2009 | Kocznar et al. | |
| 2009/0085723 A1* | 4/2009 | Traub | H04Q 9/00 340/10.3 |
| 2009/0258592 A1* | 10/2009 | Huang | H04K 3/86 340/572.1 |
| 2011/0001606 A1 | 1/2011 | Charych | |
| 2011/0074582 A1* | 3/2011 | Alexis | G08B 13/2448 340/572.1 |
| 2011/0095087 A1* | 4/2011 | Master | B66F 9/0755 340/10.1 |
| 2011/0095868 A1* | 4/2011 | Horne | G06K 19/07336 340/10.1 |
| 2011/0304434 A1* | 12/2011 | Kohli | G06K 7/0008 340/10.1 |
| 2011/0309910 A1* | 12/2011 | Lee | G07C 9/257 340/5.52 |
| 2012/0092166 A1* | 4/2012 | Allen | G08B 13/2488 340/572.1 |
| 2013/0200992 A1* | 8/2013 | Kim | A61H 3/066 340/4.11 |
| 2013/0332271 A1* | 12/2013 | Hay | G06Q 20/208 705/16 |
| 2013/0339221 A1* | 12/2013 | Gentelet | G06K 7/10128 705/39 |
| 2014/0159869 A1* | 6/2014 | Zumsteg | G07G 1/009 340/10.1 |
| 2014/0266615 A1* | 9/2014 | Ouyang | G01S 5/0252 340/10.1 |
| 2014/0266617 A1* | 9/2014 | Wilkinson | G08B 13/2417 340/10.1 |
| 2014/0313015 A1* | 10/2014 | Duron | G06K 7/10425 340/10.3 |
| 2016/0042333 A1 | 2/2016 | Ho et al. | |
| 2016/0307087 A1* | 10/2016 | Cruickshanks | H04B 5/0062 |
| 2016/0351034 A1* | 12/2016 | Trivelpiece | G08B 13/2402 |
| 2017/0055157 A1 | 2/2017 | Bergdale et al. | |
| 2017/0161711 A1* | 6/2017 | Chin | G06K 7/10009 |
| 2019/0311164 A1* | 10/2019 | Teter | G06K 7/10079 |
| 2020/0279240 A1* | 9/2020 | Glaser | G06Q 20/203 |

OTHER PUBLICATIONS

Busu et al., Auto-checkout system for retails using Radio Frequency Identification (RFID) technology (Year: 2011).*

Park et al., Passive Radio-Frequency Identification Tag-Based Indoor Localization in Multi-Stacking Racks for Warehousing (Year: 2020).*

Josh Mchugh, Attention, Shoppers You Can Now Speed Straight Through Checkout Lines (Year: 2004).*

Panasonic, RFID Based Walk-through Checkout Solution for Future Retail (Year: 2018).*

Buettner et al., "A "Gen 2" RFID Monitor Based on the USRP", ACM SIGCOMM Computer Communication Review. vol. 40, No. 3. Jul. 2010. pp. 42-47.

Waldemar Zielinski, "Union of two arithmetic sequences Basic calculation formula", viXra.org—General Mathamatics. viXra:1712. 0636v5. Oct. 11, 2019. pp. 1-7.

* cited by examiner

US 11,379,676 B2

RFID-BASED SELF-CHECKOUT SYSTEMS USING CYCLE COUNTING

RELATED APPLICATION INFORMATION

This application claims priority to Provisional Application No. 63/003,363, filed on Apr. 1, 2020, the contents of which are incorporated herein by reference in their entirety.

BACKGROUND

Technical Field

The present invention relates to RFID-based self-checkout systems and, more particularly, to methods and systems related to a radio frequency identification (RFID) walk-through gate.

Description of the Related Art

Radio frequency identification (RFID) tags are electronic devices that can be affixed to items whose presence is to be detected and/or monitored. The presence of an RFID tag, and therefore the presence of the item to which the RFID tag is affixed, may be checked and monitored by devices known as "readers" or "reader panels." Readers usually transmit radio frequency signals to which the RFID tags respond. Each RFID tag can store a unique identification number. The RFID tags respond to reader-transmitted signals by providing their identification number and additional information stored on the RFID tag based on a reader command to enable the reader to determine an identification and characteristics of an item.

SUMMARY

An RFID-based checkout system is presented. The RFID-based checkout system includes an RFID reader to interrogate RFID tags by using a plurality of antenna ports, an activation sequencer to determine an activation sequence of the plurality of antenna ports that have been enabled, a collector to collect RFID tag responses from each of the RFID tags, and a matcher to match one or more of the RFID tag responses to a particular antenna port of the plurality of antenna ports in an activation cycle.

A method for cycle counting is presented. The method includes interrogating, by an RFID reader, RFID tags by using a plurality of antenna ports, determining, by an activation sequencer, an activation sequence of the plurality of antenna ports that have been enabled, collecting RFID tag responses from each of the RFID tags, and matching one or more of the RFID tag responses to a particular antenna port of the plurality of antenna ports in an activation cycle.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
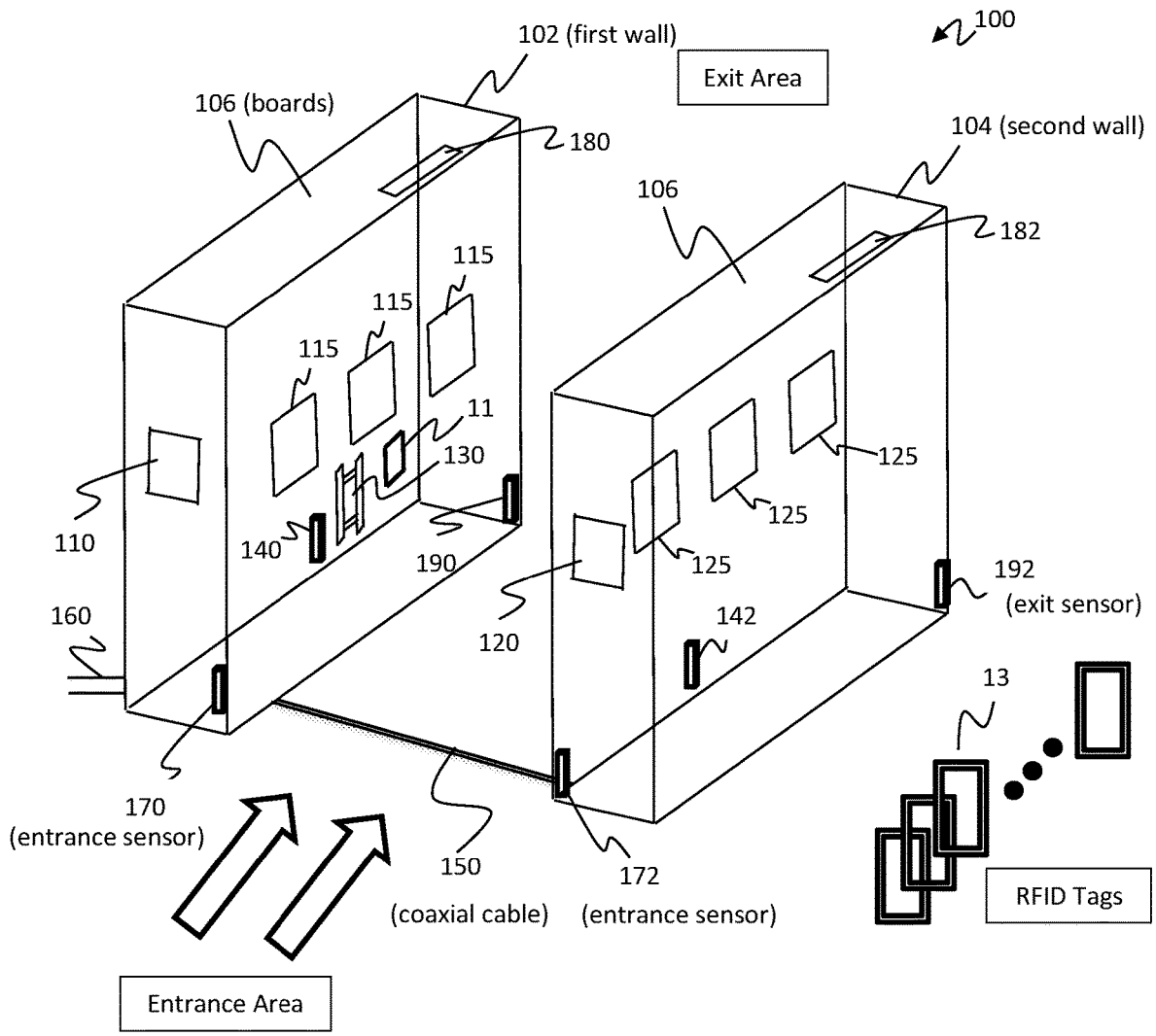
FIG. 1 is a block/flow diagram of an exemplary RFID-based self-checkout system, such as a walk-through gate (WTG) including a plurality of antennas and sensors, in accordance with embodiments of the present invention.

The accuracy of a decision or estimation problem highly depends on its observation. Of course, in the abstract form of these problems, the observation set is assumed to follow a particular distribution. However, in practice, formulation of an instance of a decision problem, say classification, includes the design of an observation process as well. It is beneficial to select what feature can be used as an observation. Also, it is beneficial to understand how the selected observations sample the feature space.

Uniform sampling of the feature space is usually preferable in most scenarios. Uniform sampling is not always possible in many scenarios where the feature space is unknown. However, uniform sampling may be achieved with respect to particular parameters. The process of making the observations comply with such uniform sampling with respect to a parameter may be referred to as equalization. For example, in classification of RFID tags into two groups of inside and outside tags, the exemplary embodiments attempt to find an effective set of observations from the reading of the tags such that the exemplary embodiments read each inside tag at least one time, and read that tag at least once by each reader on each transmit/receive antenna pair (possibly the same antennas or different antennas) for which an inside tag is readable by that pair (if there is no collision and it is given enough time).

A simple scenario is considered where the reader is mono-static and has N antenna working in time division multiple access (TDMA) mode going through antennas 1 to N in ascending order and repeating the process from antenna 1 again. Further, the case is considered where a tag is readable by every antenna and the exemplary embodiments collect observations such as the average received signal strength (RSS) and number of readings per antenna. If the exemplary embodiments start the cycle by antenna 1 and stop in the middle of a cycle, say at antenna k<N, before reaching the Nth antenna, then the tag has not been given a chance to respond to the antennas that were not activated in this cycle. Hence, the feature vector may be confused with that of a tag which would have only responded to the antennas 1 to k. The same issue exists in scenarios where multiple full cycles are used but stop the readings in the middle of the last cycle.

Regarding a practical application, the slow and inconvenient checkout process in retail stores often leads to frustration for many shoppers. Standing in a line to get to the checkout counter is not fun, let alone the wait endured to finish the transaction especially when purchasing a large number of items. The process is further complicated by having to manually load/unload products to/from a specific area such as the moving belt at the manned counters or the scanning and weighing area at the self-checkout machines. Recent reports indicate that a length of checkout lines and the overall experience have a significant impact on where people choose to shop. Therefore, offering a more convenient checkout experience is one of the high-priority goals for many retailers to earn the loyalty of their customers.

Self-checkout stations are currently the most widely adopted solution for making the checkout process more convenient. When the cashier-operated counters have long lines, using self-checkout stations is faster, especially for a small number of items. However, the customers must locate the barcode on the product package and align it with the reader to scan it correctly, sometimes trying many times until a "beep" is heard. Further, the items must be correctly placed on the weighing station to continue scanning the next product. Consequently, this multi-step process creates frustration among shoppers.

The root cause of many of the issues with the existing checkout process is the inefficiency of barcode-based scanning. Since barcodes work in line-of-sight, barcodes first have to be manually located and then aligned with the scanner to have an unobstructed view of the code. This inevitably leads to the products being scanned one at a time and eventually slows down the process. Recent technologies replicate a barcode many times to completely cover a product's package while being invisible to the human eye. Since it suffices to scan any of the identical barcodes, the chance to get a successful read, and, hence, the speed of scanning increases. However, the line-of-sight operation still requires that the products are scanned one at a time without obstructing each other.

Some retailers aim to eliminate long checkout lines by allowing customers to scan products using their personal smartphone's camera as they are adding them into their cart. With such applications, the customer is responsible to locate the barcode of each item and correctly scan them one at a time. Thus, this does not reduce the actual time spent for scanning but simply spreads it throughout the customer's shopping journey. Further, the customers need to scan an item again to remove it from their transaction if they choose to return it back to the shelf. It is likely due to this cumbersome manual operation that certain retailers discontinued their implementation of such a technology citing low participation from their customers.

As an alternative to barcodes, some checkout systems rely on computer vision to recognize products using a camera equipped with artificial intelligence (AI) technology. By using a database of images taken from different angles, such systems can recognize products in various positions and may also allow multiples of them to be detected simultaneously. Although camera-based identification is promising, it suffers from the same obstruction problem as barcodes, and, thus, requires the customers to carefully lay out items such that they do not block each other from the camera's view.

To realize a truly seamless checkout experience, highly sophisticated and futuristic systems utilize computer vision augmented with various other sensors (e.g., weight) to automatically identify the products that have been picked up by customers through continuously monitoring their actions during the shopping journey. When the customers are ready to leave the store, they can simply "walk out" and get billed automatically based on a payment method they registered with the store. Led by Amazon Go, several examples of these promising technologies have been developed. However, none of these systems appear to utilize RFID to identify the products. The exemplary embodiments explore the potential of RFID in a retail checkout scenario and illustrate that RFID can be another technology for realizing a truly seamless checkout experience.

Investigating the use of RFID in seamless checkout applications is beneficial for a few reasons. First, RFID is already being used by several major apparel retailers. These retailers primarily use RFID for tracking items in the supply chain and its application for seamless checkout is yet to be explored. Second, RFID is also gaining popularity in other retail sectors such as convenience stores as evidenced by the Electronic Tag Initiative of the Japanese government with the goal of having RFID tags on every product by 2025. Third, combined with the decreasing price trend for RFID tags, it is expected that more retailers will adopt RFID in the future. Fourth, RFID readers can identify hundreds of RFID tags per second over a wider range than a barcode reader while not suffering from the usual obstruction problem existing in line-of-sight communication. This promises significantly faster and more convenient scanning than barcodes for a large number of items.

The exemplary embodiments introduce a system where customers bring the items they picked to a dedicated checkout area that is large enough to fit a shopping cart (e.g., groceries) or a customer with multiple shopping bags in her hand (e.g., apparel). It is in this dedicated checkout area that the system should identify all the products in the shopping cart (or bag) without the user having to even take them out or align them with a particular RFID reader antenna. In addition, scanning should be completed as fast as possible. Although individual RFID tags would be read one after another, the sheer speed of doing so should create the impression that all products are being identified "simultaneously." Also, the system must meet stringent accuracy requirements of the retail checkout application based on key metrics, namely its precision and recall.

The set of readings collected by the system during scanning may include tags present inside or outside the checkout area. Analyzing these readings, the system retrieves a group of tags it believes to be inside. Precision is the ratio of the number correctly retrieved items (which are those that are indeed present inside the checkout area) to all retrieved items. The ideal system should have 100% precision and it should not retrieve even one item incorrectly to avoid charging the customer for an item that is not inside the checkout area. Recall is the ratio of the number of correctly retrieved items to all items present inside the checkout area. The ideal system should also have 100% recall and it should not undercharge the customer by not retrieving an item that is present inside the checkout area. Realizing such a system is not straightforward due to challenges associated with RFID.

Regarding blind spots, RFID tags are best read when they are oriented in a way that maximizes the received power induced at the tag's antenna. For a flat tag, this happens when the received signal from the reader is orthogonal to the plane of the tag's antenna. Any deviation from this ideal orientation may reduce the signal strength of the tag's response and even make the tag not readable at all. The exemplary embodiments call the position and orientation for which a tag is not readable a "blind spot." Blind spots occur either due to weak illumination where the tag is not activated by the reader's query so does not even reply to it or due to weak response where the tag responds to a query, but it is not decodable by the reader. Note that the definition of "blind spots" reflects only what happens at the physical layer and excludes medium access control (MAC) layer effects such as collisions. While collisions may eventually be resolved by the tag random access protocol, a tag situated in a blind spot will continue to be not readable indefinitely (assuming a stationary environment). To complicate matters even further, the signals backscattered by other tags in the vicinity also impact a particular tag's reading. For example, a tag may be detected at some position when it is the only tag in the reader's view but the same tag may not be readable when other tags are brought within the reader's range (without changing the observed tag's position and orientation). For the checkout process, blind spots outside the checkout area are not important since outside tags should not be retrieved by the system anyway. However, removing blind spots inside the checkout area is crucial since they may result in less than 100% recall, costing the retailer revenue loss.

Regarding collisions, in addition to blind spots, a tag's response may not be decodable due to colliding responses from other tags that are simultaneously arriving at the reader. Similar to blind spots, collisions may result in less than 100% recall. Although, given enough time, the random-access protocol may resolve collisions, a long resolution time might not be affordable within the requirements of the checkout application. Thus, in addition to the random-access protocol, a mechanism should be designed to address the collisions.

Regarding position uncertainty, since the response from an RFID tag may get reflected multiple times before reaching the antenna, it is not possible to pinpoint the location of the tag based on a single reading. Several attempts have been made to accurately localize tags with some of them claiming decimeter-level accuracy by collecting phase measurements over time. However, recent studies showed that such techniques are not "robust against even minor variations in tag geometry, e.g., changes in a tag's orientation or flexing" and high positioning accuracy may only be reachable in "stable environments (e.g., no people are moving)." Clearly, these are not realistic expectations in retail environments. Without the possibility of accurate localization, it is challenging to achieve 100% precision and recall.

The exemplary embodiments implement a walk through gate (WTG) which includes a physical structure, detection software, and communication system that work in harmony to address the aforementioned challenges.

The physical structure includes multiple antennas arranged in particular positions and orientations to reliably capture readings from multiple tags. This arrangement helps in alleviating blind spots and allows the collection of multiple readings of the same tag from a variety of antenna locations, which in turn form the set of features that are fed to detection software.

To realize an extremely fast retrieval process, the exemplary embodiments implement a standard-compliant custom-designed RFID reader using GNU Radio. The reader realizes simultaneous reception of a tag's response from multiple antennas which are equipped with their own RF chains that are synchronized at the carrier level. The exemplary embodiments significantly shorten the time required to collect a set of tag observations compared to state-of-the-art RFID readers using the same number of antennas. Further, having spatial diversity in receiving multiple copies of a tag's response, the exemplary method is capable of handling collisions in a timely manner. Achieving the desired retrieval speed would have not been possible with commercial RFID readers which receive tag responses using one antenna at a time and switch between their antennas in time division duplex (TDD) fashion.

Finally, the exemplary system relies on its detection software component to solely detect all the tags that are inside the self-checkout area despite possible existence of other nearby outside tags. The exemplary embodiments formulate a binary classification problem to partition the tags into "inside" and "outside" groups and solve it by training a neural network model using supervised learning. Using the readings collected from multiple antennas, the exemplary model achieves X % precision and Y % recall without having to explicitly estimate tag positions.

FIG. 1 shows the inside area of a walk through gate (WTG). The inside area is the volume between the two-side wall of the WTG and it may also include a bigger volume directly above the gate and slightly outside the gate entrance and the gate exit.

Figure 2:
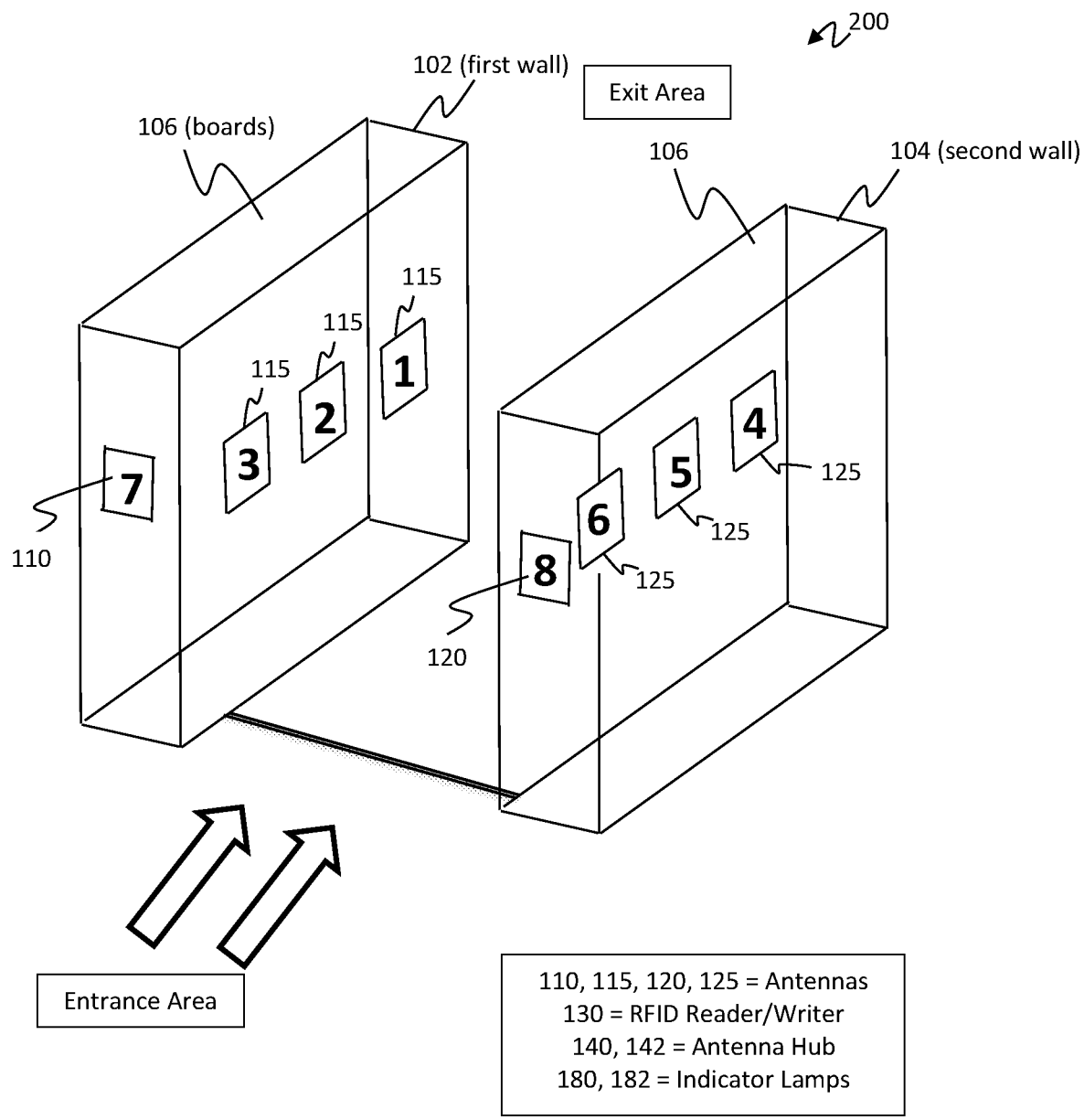
FIG. 2 is a block/flow diagram of exemplary placement of antennas in the WTG of FIG. 1, in accordance with embodiments of the present invention.

FIG. 2 illustrates the inside and outside antenna examples that are placed on the WTG walls. Such antennas may be made of transparent conductive mesh as well in order to make the side antennas transparent.

The WTG 100, as shown in FIG. 1, includes multiple physical components with a particular structure, as well as software components that implement the tag detection and classification algorithm. The WTG is an extended walk-way between two walls with a height of A, thickness of B, and length of L, e.g., 130 cm. The width of the walk-way between the two walls is W, e.g., 75 cm. The volume between the two walls and the volume directly above that up to a given height, say H, is defined as "inside" of the WTG and any other position that is not inside the WTG is considered "outside" the WTG.

A "session" is defined as an interval of time to determine the collection of all tags 13 that are inside the WTG 100 (FIG. 1). The "session duration" is a duration of the time interval in which the session has occurred.

A group of antennas 110, 115, 120, 125 are supposed to read the tags 13 that are inside the WTG 100. These antennas 110, 115, 120, 125 are generally placed on the boundary of the inside area of the WTG 100 and are oriented toward the inside of the WTG 100. These antennas are referred to as "inside antennas." Similarly, "outside antennas" are the antennas that are placed close to the boundary of the inside and outside of the WTG and oriented away from the inside of the WTG 100. These antennas read the tags 13 that are outside the WTG area.

A "decision algorithm" of a judgement module 11 uses the reading from the inside and outside antennas during a session to decide whether a tag 13 is located inside or outside the tunnel. The process of assigning a label to a tag 13 as being "inside" or "outside" is referred to as "claiming." Through this process, each tag 13 is claimed to be "inside" or "outside" only once and when the decision is reached it will not change. However, a tag 13 can remain unclaimed for a duration of the time until enough reading is reached or enough time has elapsed. Any tag 13 that has been read once is referred to as a "pending tag" while it has not yet been claimed.

A person "enters" the WTG 100 when such person moves from the outside region to the inside region of the WTG 100. A person "exits" the WTG 100 when such person moves from the inside region to the outside region. It is assumed that once a user enters the WTG 100, the user does not bring in any new tags inside the WTG or throws out any tags that the user already has with them.

A session has a beginning where it marks the time that the items of interest are all within the WTG 100. The "session start time" must precisely mark the time where only the items of interest are inside the WTG 100. This means that all the items of interest are within the WTG and no extra tag is within the WTG.

It is noted that the "session" is not defined on a per tag basis. In other words, the WTG 100 cannot have two different sessions that partially overlap. If two sessions overlap, they entirely overlap. This means that the WTG 100 cannot be continuously operated by passing the tags through the WTG 100 where a new tag enters the WTG 100 while there is still one pending tag with the WTG 100.

In FIG. 1, the WTG 100 includes a first wall 102 and a second wall 104. The first wall 102 includes an entrance sensor 170 and an exit sensor 190. The second wall 104 includes an entrance sensor 172 and an exit sensor 192. The first wall 102 further includes 8 antennas 110, 115. Antennas 110 are positioned on a front and back surface of the first wall 102, whereas antennas 115 are positioned on side walls of the first wall 102. Similarly, the second wall 104 further includes 8 antennas 120, 125. Antennas 120 are positioned on a front and back surface of the second wall 104, whereas antennas 125 are positioned on side walls of the second wall 104. The first wall 102 further includes an RFID reader/writer 130, as well as an antenna hub 140 and a judgement module 11. Similarly, the second wall 104 also includes at least an antenna hub 142.

A coaxial cable 150 connects the first wall 102 to the second wall 104 of the WTG 100. The coaxial cable 150 is positioned near the entrance of the WTG 100. The entrance is designated by the arrows. The first wall 102 also includes a local area network (LAN) cable 160. The first and second walls 102, 104 of the WTG 100 are constructed from aluminum frames and can include acrylic boards or aluminum boards 106.

In one exemplary embodiment, the first wall 102 includes a session lamp 180 at a top surface of the first wall 102 and the second wall 104 includes a session lamp 182 at a top surface of the second wall 104.

With reference to FIG. 2, system 200, there are total of 6 antennas inside numbered from one to six plus two additional antennas for outside facing toward the entrance of the WTG numbered 7 and 8. In order to indicate that the WTG is "in session" or "not in-session," the indicator lamps 180, 182 can be used. Such indicator lamps 180, 182 should be visible to the person attempting to enter the WTG area as well as the person who is anywhere inside the WTG area. Hence, it is advised to use the session indicator lamps 180, 182 on top of the walls 102, 104 closer to the exit area.

Figure 3:
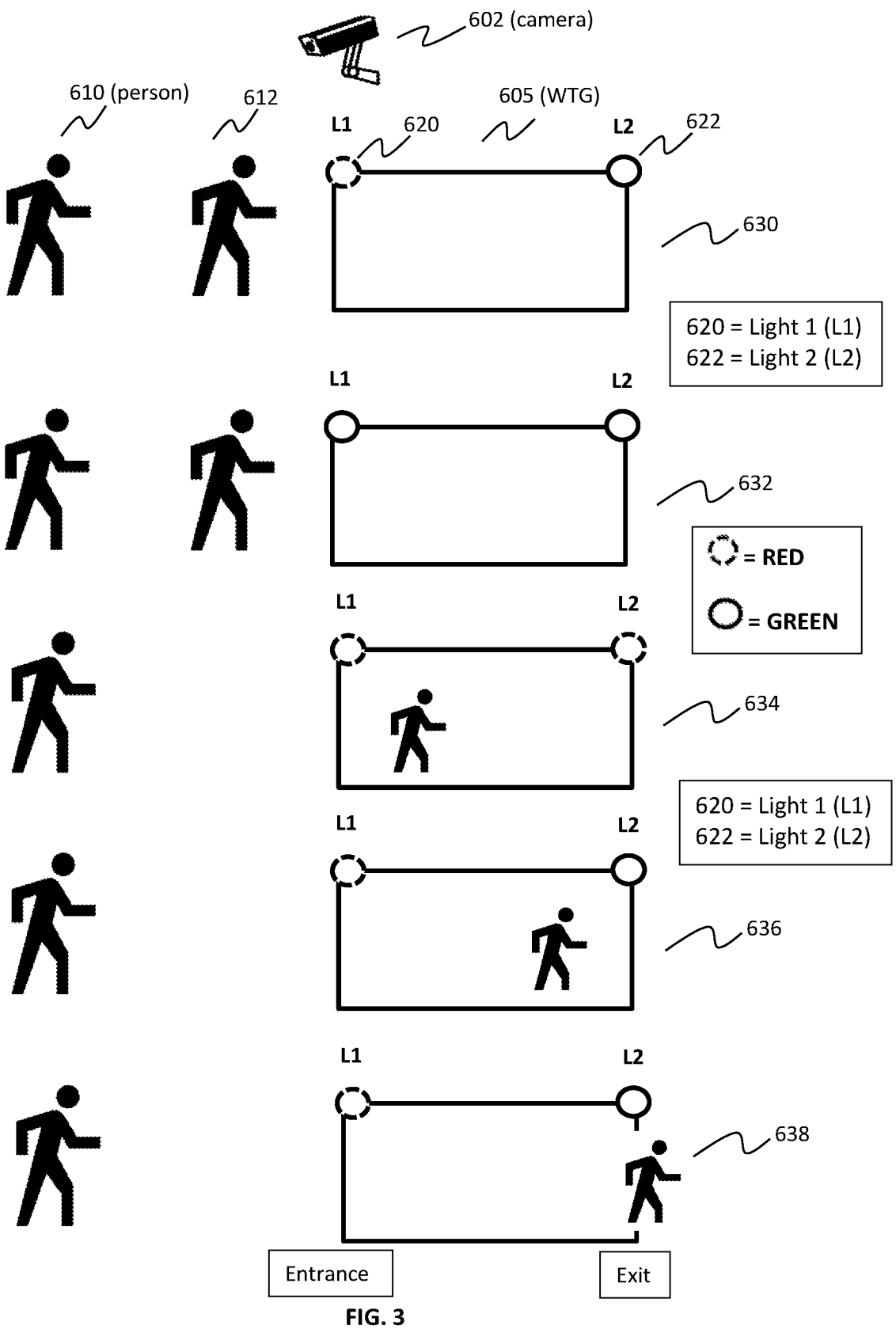
FIG. 3 is a block/flow of a practical application of the WTG of FIG. 1 depicting how session indicator lamps function when a person crosses through the WTG, in accordance with embodiments of the present invention.

In FIG. 3, the system state diagrams of a user journey are presented, as a practical application at a retail store.

Since user verification is required, it is assumed that the users 610, 612 are already registered, by the camera 602, to be able to use the WTG 605.

Diagram 632 shows that when the user face is verified, both lights 620, 622 are green indicating that user 612 can freely enter.

In diagram 634, as soon as the user 612 enters WTG both lights 620, 622 turn red indicating that the user 612 is inside the WTG 605, cannot exit, and no other user can come in.

In diagram 636, when the reading is complete, only the exit light 622 turns green indicating that the user 612 can exit. However, the internal state clearly does not allow a new face verification to occur.

When the user exits in diagram 638, the lights 620, 622 do not change and remain red at the entrance and green at the exit. Also, the system goes back to the state in diagram 630, which allows for the new face 610 to be verified.

As noted, L1 is the entrance light, L2 is the exit light, S1 is an entrance IR sensor, and S2 is an exit IR sensor.

The exemplary embodiments address the problem of finding the set of readings collected by the system which are used by the detection software. In particular, the exemplary embodiments describe the concept of antenna cycles. The exemplary embodiments address the antenna cycle feature in connection with commercial and off-the-self (COTS) RFID readers as well as more capable custom-designed (CD) RFID readers. Such CD may give the user the capability to for example, dynamically select antennas, dynamically select the frame size (the number of slots per query or rep-query frame) and the transmission/reception frequency for each frame. CD may also be able to synchronize transmission between multiple transmission points and change the select commands on a frame-by-frame basis. Any combination of such capabilities along with a controlling algorithm that can dictate how these features are controlled dynamically may be used to improve the quality of the features and the feature selection in relation with antenna cycling.

A reader may use more than one antenna and activate the antennas at different time intervals. Alternatively, the reader equipped with multiple antennas may activate multiple antennas at the same time using different beamforming weights. The beamforming weight may be chosen out of codebook entries. Antenna cycling is the process of activating a sequence of virtual antennas in different time intervals in TDMA fashion. A virtual antenna could be an antenna port, an actual antenna, or a given set of antennas with a particular beamforming weight, etc. Virtual antennas may be defined for transmission or reception.

The reader has an activation sequence. The activation sequence is the sequence in which antennas become active. Activation sequence is defined such that every two consecutive elements of the sequence are different. An antenna within an activation sequence may be skipped by the reader for different reasons, e.g., not having enough reading or coverage, or when a physical antenna is not connected to the antenna port, etc. The readings may also not appear for a particular antenna in a sequence even if it is activated. The time per antenna is not deterministic, or it could be variable.

It is noted that both antenna cycling and activation sequence are defined mainly in relation to transmit antennas. The same may be also defined in relation to the receiver antennas. Whenever the terms "activation sequence" or "antenna cycling" are used, they are in reference to transmit antennas unless the exemplary embodiments specify otherwise. In mono-static readers, the same antenna that is used for transmission is used for reception, hence, activation sequence and antenna cycling for both transmit and receive antennas are the same.

In a bi-static reader, a receive antenna is paired with a transmit antenna but the receive antenna is not the same as the transmit antenna. Hence, the activation sequence (or antenna cycling) defined for transmit antennas is defined the same for the receive antennas.

More advanced readers are capable of simultaneous multi-port (SMP) operation, where a set of receive antennas may be simultaneously used to decode tag replies. This means that even a single tag reply may be decoded by several different antenna ports or virtual antennas. The virtual antenna for the receiver may be defined the same way it is defined for the transmit antennas. Hence, a particular activation of a transmit antenna may be received from multiple virtual antennas. The set of virtual receive antennas per virtual transmit antennas may be predefined, in which case the activation sequence (or antenna cycling) defined over a set of virtual transmit antennas can be naturally defined on the corresponding sets of virtual receive antennas. However, a decoding on a particular virtual receive antenna does not necessarily come from an active query from a unique virtual transmit antenna anymore (unlike mono-static or bi-static operation).

Depending on how much information is known about an activation sequence, the strategy to synchronize the readings with their position in the activation sequence varies. The exemplary embodiments denote an activation sequence with ordered tuples where its entries are taken from the set of virtual antennas. The exemplary embodiments explain different types of antenna cycling in descending order of known information about the activation sequence.

Type A) is when the activation sequence is generated by repeating a given mother sequence. The exemplary embodiments denote a sequence by an ordered tuple and define a primal sequence as an ordered tuple without repetition. This means that a given antenna can appear in the primal sequence of an antenna only once. In Case A, the activation sequence is generated by repetition of the mother sequence where the mother sequence is a primal sequence.

In one example, 9 antennas are considered and denoted by the numbers 1 to 9. A primal sequence may be given by (1, 3, 4, 2, 8, 7). The sequence (1, 3, 5, 4, 6, 7, 4, 8) is not a primal sequence because "4" repeats twice in two different positions.

Type B) is when the activation sequence is generated by repeating a mother sequence and the mother sequence is not a primal sequence. Hence, the mother sequence may have a repetition in this case. Nonetheless, the exemplary embodiments always assume that two consecutive elements of a mother sequence (including the circular case, e.g., first element and last element of the mother sequence) are always distinct. Every finite sequence can be written in terms of a sequence of primal sequences. However, such composition of primal sequence is not unique. Since a mother sequence is finite, it can be written in terms of primal sequences.

In one example, a system with 9 antennas is considered and denoted by 1 to 9. The non-primal sequence (1, 3, 5, 4, 6, 7, 4, 8) as in the previous example may be written as a sequence of two primal sequences (1, 3, 5, 4) (6, 7, 4, 8) or (1, 3, 5, 4, 6) (7, 4, 8). Hence, it is clear that the decomposition of a sequence into a sequence of primal sequences is not unique.

Type C) is when the activation sequence is generated as a sequence of primal sequences where every two primal sequences are permutations of each other. Clearly, the primal sequences in the decomposition of the activation sequence are all permutations of the same set of antennas. This set of antennae are called the activation set. In this case, the activation sequence is not generated by repeating a mother sequence as in Case A or Case B. However, Case C can be defined based on the activation set. The activation sequence is defined as a sequence of primal sequences where each primal sequence is a permutation of the activation set.

For example, a system with 9 antennas is considered and denoted by 1 to 9. The activation set is defined to be 1, 4, 2, 6, 7. A snapshot of the activation sequence for this activation set could be: (1 4 6 7 2) (1 2 6 4 7) (7 6 2 1 4).

Antenna cycling is primary used to divide the action of a reader into several different chunks of time as if in each chunk a different reader is operating. Since reading of each tag happens in milliseconds, several antennas may be covered in an antenna cycling strategy within a second. Therefore, if the delay is tolerable, the antenna cycling may work as if several readers were working in parallel.

Antenna cycling may be used to achieve different goals. Antenna cycling may be used to extend the coverage of an RFID reader by placing the antennas in different regions with little coverage overlap. Another possibility is to use the antenna cycling to increase the discovery probability of new tags within a given area. By employing antennas in different positions and orientations, different subsets of a tag population are targeted, and, hence, it is possible to increase the rate of discovering the tags. Discovering, in this context, refers to finding a tag or reading a tag at least once from any antenna connected to the reader.

In some readers, the readings are not associated with the transmit antennas, but the receive antennas. This means that for each reading, one can tell from which receive antenna the reading is received but cannot tell which transmit antenna was active at the time of the reading. Knowing the receive antennas for the mono-static readers and bi-static readers determines the transmit antenna. However, for SMP this is not true, and it cannot be determined when a reading is received from a subset of antenna and what transmitter was active. For example, a reader working in SMP mode can receive from antennas 1, 2, and 3, while antenna 4 is transmitting and from antennas 1, 2, and 5, while antenna 6 is transmitting. If a reading is simultaneously received from only antennas 1 and 2 only, it is not possible to say if antenna 4 or 6 was active. Some other reader may specify the active transmit antenna for a reading.

In either scenario, a tag may not respond in a given query session. Thus, when the antennas are activated in a sequence, there would be no reading of the tag for some antenna configuration within the sequence. It is noted that a tag may not respond to a query from a given antenna at one time, while in another time the tag replies to the query from the same antenna.

Cycle counting means to be able to know where a reading lies with respect to an activation sequence when the activation sequence is known. If the activation sequence is not known a priori, cycle counting means estimating the activation sequence as well as the position of a reading with respect to the activation sequence.

The problem of cycle counting arises when the reader does not provide any indication of which antenna is active over time. Even though, the reading of a tag may come with the information about the receive antenna, the transmit antenna, or both, it is not enough to directly know where in a particular activation sequence such reading has been received. This is due to the fact that a tag reply is random, and a tag may not reply to a particular query, or its reply may not be decodable by the reader.

Therefore, to reduce such randomness, the exemplary embodiments consider all the received replies (from all the tags) in order to perform cycle counting. To this end, it is also possible to add reference tags in order to facilitate cycle counting. The reading from a reference tag (or multiple reference tags in the case of SMP) may be used to virtually mark the activation of a particular transmit antenna. However, such tag may generate unwanted interference and/or collisions as well.

Antenna cycling may also be used in some applications to gather different observations for the tags that are in the sample space, e.g., in a reading range of the reader antennas. Such observations may be used in applications involving classification of the tags in different groups based on their response properties. Classification of the tags that belong to specific volumes in space, grouping of the tags based on their proximity, or localization of the tags based on reference tags is among the possible use cases of such group observations.

The quality of the observation depends on the distribution of such observations. One of the aspects in modeling and use of observations is the equalization of the observation between different observation sets. This means that the set of observations gathered, say for classification in a different scenario should reflect through sampling of the distribution. This is particularly true when a given set of such observation sets are used to train the model and later such model is used on the observation set obtained through actual system runtime.

The exemplary embodiments refer to the process of making an observation to comply with the through distribution as equalization. The equalization involves controlling several aspects of the design including the carrier frequency, observation interval, antenna sequence, etc. The exemplary embodiments focus on the effect antenna sequence including normalization of the observation in connection to the antenna cycles, selection of the antenna sequence, and dynamic adjustment of antenna sequence to improve quality of observations.

To have a uniform view of the sampling space of the reader, the reading needs to be normalized. Such normalization includes giving each antenna equal opportunity in sampling its share of the space. Equal opportunity may be realized through equal or proportional fairness criteria. Counting the antenna cycles and synchronizing the reading with such cycles allows normalization to be performed with respect to the cycles. One possibility is to only use the observations that are obtained within full cycles. The number of full cycles may be used as an observation parameter or the readings may be normalized with respect to the number of full cycles.

In a case that observations are obtained in multiple full cycles and a fraction of a cycle, the normalization may be performed per antenna basis based on the number of full cycles and the set of antennas that are used in the fraction of the cycle. For example, normalization may use the number of times that an antenna (or pair of transmit-receive antennas) is given an interval for querying the tags.

Hence, the goal is to become synchronized with the activation sequence if it is known. If the activation sequence is not known, the goal is to find the activation sequence and become synchronized with it.

In order to synchronize the reading with a cycle, the exemplary methods rely on the order of reading in time. This could be even more precise by having the actual time stamp which not only provides the relative order of the reading but also the time difference between any two readings, and the information about the associated antenna to each reading. It is noted that in a case that multiple readers are employed, the relative reading has to be available across the readers. The time stamp from each reader, as well as a known time difference between two readers, is enough to have absolute time of each reading in a unified time.

Three different antennae cycling, e.g., type A, B, and C, were described above. For type A or B, the activation sequence is fixed but may or may not be known. Three different types of readers may be employees, mono-static, bi-static, or SMP. For mono-static and bi-static, the reading antenna directly indicates the activated transmit antenna, which is referred to as a unique transmit and receive antenna map (UTRAM). For SMP readers, an active transmit antenna is associated with multiple receive antennas, which is referred to as a multiple transmit and receive antenna map (MTRAM). The exemplary embodiments provide a solution as to how to perform cycle counting in different scenarios:

Scenario I) Known and fixed activation sequence of type A (e.g., mother sequence is primal) using UTRAM.

Without loss of generality, an activation sequence of length L can be considered as a (1; 2; : : : ; L) for virtual antennas 1 to L by naming the corresponding virtual antennas in the activation sequence in this order. Otherwise, there is a permutation which can be applied to the naming of the antennas, which result in an activation sequence of the form (1; 2; : : : ; L). Assuming that the readings (of all available tags) are ordered, the exemplary embodiments can generate a reading list of [l1; l2; : : : ; lC] of C readings where lk is the corresponding virtual antenna for the kth reading.

Regarding the alignment problem, the cycle counting problem can be defined in terms of alignment of the activation sequence with the reading list. The cycle count is then equal to the number of primal sequences and its fraction in the corresponding aligned sequence.

Regarding the alignment condition, it is noted that in the corresponding alignment problem, that the activation sequence may have extra elements which do not appear in the reading list, but the reading list cannot have a reading for which the corresponding antenna does not exit.

The exemplary embodiments define alignment of two sequences as minimal alignment (or simply minimal), if its cycle count is the minimum achievable value for any alignment which complies with alignment conditions.

Scenario II) Known and fixed activation sequence of type B (e.g., mother sequence is not primal) using UTRAM.

The solution is the same as Scenario I.

Scenario III) Unknown and fixed activation sequence of type A (e.g., mother sequence is primal) using UTRAM.

In this scenario, the exemplary embodiments first employ the algorithm discussed below to find a minimal alignment solution and its associated activation sequence. In order to find the primal sequence associated with the activation sequence, the exemplary embodiments perform the following first algorithm.

Regarding the first algorithm, the exemplary embodiments consider sub-sequences of the activation sequence by splitting the activation sequence into several pieces where no two sub-sequences overlap and each sub-sequence starts with the same antenna as a1. Then, the mother sequence will be the union of all sub-sequences found in the previous step.

The union of two sequences is defined as the smallest length sequence that includes both sequences as a subsequence. A sub-sequence is a sequence that is formed by selecting a subset of the elements of a sequence in the same order as the original sequence, e.g., if a first element appears before the second element in the original sequence, the first element should appear before the second element in the subsequence.

It is noted that the union of two sequences is not necessarily unique. Also, the union of two primal sequences is not necessarily a primal sequence. For example, both (1, 2, 3, 4, 5, 6) and (1, 2, 4, 3, 5, 6) are primal sequences. However, their union sequence is not unique and either of (1, 2, 3, 4, 3, 5, 6) or (1, 2, 4, 3, 4, 5, 6) is their union sequence. Also, neither one of the union sequences is a primal sequence.

It can be shown that if the reading comes from a fixed activation sequence that is generated from a mother sequence that is primal, then the sub-sequences obtained though partitioning of the activation sequence in the first algorithm are all primal sequences, and the union of the sub-sequences obtained in the first algorithm would be a primal sequence.

Scenario IV) Unknown and fixed activation sequence of type B (e.g., mother sequence is not primal) using UTRAM.

Similar to the solution for Scenario III, in this scenario, the exemplary embodiments employ the algorithm below to find the minimal alignment solution and its associated activation sequence. In this case, the mother sequence is not primal and does not have any constraint aside from not having repetition in the adjacent elements. Hence, the activation sequence found the fourth algorithm can be interpreted as the mother sequence.

Scenario V) Unknown and variable activation sequence of type C (e.g., activation set is fixed) using UTRAM. In this scenario, the exemplary embodiments first employ the explicit solution for the alignment problem when activation sequence is not known to find the minimal alignment solution and its associated activation sequence. In order to find the sequence of primal sequences associated with the activation sequence, the exemplary embodiments need to partition the activation sequence such that each part is a primal sequence. Since the partitions of length 1 are always primal, such partitioning can be done by choosing partitions of length 1 for all partitions. However, in order to find the minimum number of cycles, the number of partitions has to be minimized.

The following algorithm can find the minimal number of primal sequences that collectively make the activation sequence (a1; a2; : : : ; aK).

Regarding the second algorithm: Step 1: Set the cycleindex=1; Step2: Set i=1; Step3: while i<=K; Add ai to the Cycle(cycleindex) if ai is not in Cycle(cycleindex); i=i+1; Step4: cycleindex=cycleindex+1; Step5: if i<=K goto step3.

The second algorithm provides the number of cycles in the activation sequence as well as the minimal sequence of the primal sequences. It is noted that the partitioning of the activation sequence into the primal sequences is not unique. Nonetheless, it can be shown that no other partitioning exists which has a smaller number of cycles than the one provided by the second algorithm. It is also noted that it is not possible to exactly specify if the last cycle is a complete cycle or what fraction of cycle is present in the activation sequence. However, in the scenarios where most of the antennas are present in every cycle, a probabilistic measure can be used to gauge the fraction of the cycle that exists in the activation sequence.

Regarding an explicit solution for the alignment problem between two known sequences, pairwise sequence alignment methods are used to find the best-matching piecewise (local or global) alignments of two sequences. Pairwise alignments can only be used between two sequences at a time, but they are efficient to calculate and are often used for methods that do not require extreme precision (such as searching a database for sequences with high similarity to a query). There are several methods for producing pairwise alignments, including dot-matrix methods, dynamic programming, etc. More advanced multiple sequence alignment techniques can also align pairs of sequences. Although each method has its individual strengths and weaknesses, all three pairwise methods have difficulty with highly repetitive sequences of low information content, especially where the number of repetitions differ in the two sequences to be aligned. One way of quantifying the utility of a given pairwise alignment is the "maximum unique match" (MUM), or the longest sub-sequence that occurs in both query sequences. Longer MUM sequences usually reflect closer relatedness.

In the problem at hand, where the missing element type can only happen in one sequence (e.g., the reading list) but the other sequence (e.g., the activation sequence sequence), the notion of minimal alignment is valuable. To clarify, consider an example where the activation sequence is (1, 2, 3, 4, 5) and the reading list is (1, 1, 1, 2, 2, 4, 4, 4, 5). The element "3" appears in the activation sequence but not in the reading list. However, for each type of the elements (e.g., not considering the repetition) in the reading list there is always a corresponding element type in the activation sequence.

The alignment between a first sequence (a1; a2; : : : ; aK) and a second sequence [l1; l2; : : : ; lC] can be represented by an alignment sequence of alignment tuples [s1; s2; : : :] where the alignment tuple st=(k; c) denotes that the kth element of the first sequence is aligned with the cth element of the second sequence. An alignment sequence should satisfy two properties, that is, all the tuples are distinct, and for the tuple st=(t1; t2) and tuple su=(u1; u2) such that u>t, the exemplary embodiments have u1≥t1 and u2≥t2.

In order to find the alignment sequence for the minimal alignment of an activation sequence (a1; a2; : : : ; aK) and the reading list [l1; l2; : : : ; lC], the exemplary embodiments perform the following:

Regarding the third algorithm: Step 1: Find the first ak that is equal to l1. Set s1=(s1;1;s1;2)=(ak; l1) Step 2: For all lc, 1<c≤C, do: In the reading list, find the first li after sc−1;2 that is not equal to sc−1;2. Set sc;2=li; Step 2 (continue): Then, find the first ak such that ak=sc;2, ak>sc−1;1. Set sc;1=ak.

Regarding an explicit solution for the alignment problem when the activation sequence is not known, in order to find the alignment sequence for the minimal alignment of an unknown activation sequence (a1; a2; : : : ; aK) and the reading list [l1; l2; : : : ; lC], the exemplary embodiments perform the following:

Regarding the fourth algorithm, Step 1: Set a1 equal to l1. Set s1=(s1;1; sl;2)=(a1; l1) Step 2: For all lc, 1<c≤C, do: In the reading list, find the first li after sc−1;2 that is not equal to sc−1;2. Set sc;2=li; Step 2 (continue): Set ac=sc;2. Set sc;1=ac.

At the end of this algorithm, the exemplary embodiments find an activation sequence (a1; a2; : : : ; aK) and the alignment sequence.

The following section involves how to select an antenna cycle.

The antenna cycle, e.g., the antenna activation sequence, affects the observations in different ways. First, and foremost, the difference between the fraction of the times that different antennas become active in the mother sequence affects the bias of the observation toward different antennas. The order in which the antennas become active also affects the observation, e.g., when the cycle counting is not implemented. This is due to the fact that when the length of the activation sequence for a particular session in which the observations are gathered is not an integer factor of the number of cycles and the final cycle is broken in the middle, the antennas that appear in the final fraction of the cycle will receive more attention. The same is true even if cycle counting happens and equalization if performed based on cycle counting since equalization in average generates more equalized observation not for every snapshot.

The design of antenna cycle can be performed more appropriately by considering the aforementioned effects. For example, the activation sequence can alternate between an inside an outside antenna for the walk-through gate classification problem. In a different design, one may consider an activation sequence in which almost every pair of complementary set of antennas have almost equal share in every window of the activation sequence. The example of different pair of complementary set of antennas are (the inside antennas, the outside antennas), (the left-hand side antenna, the righthand side antenna), (the high-height antenna, the low-height antenna), (the front antenna, the back antenna) (the antenna in horizontal orientation, the antennas in vertical orientation), etc.

Regarding cycle counting for multiple readers working in parallel, the problem of cycle counting for multiple readers that are working in parallel is how to find the synchronizations between the two activation sequences of two different readers.

Counting the cycles and synchronization of such cycles when multiple readers are working in parallel may be easily done if there is a time stamp associated to the readings. In a less stringent synchronization, it is enough if the exemplary embodiments are able to order the reading packets between all readers with a single clock. In either case, the problem is then relaxed to perform cycle counting in a single reader that the exemplary embodiments have addressed before. If every reading has a time stamp, then each reader can do the synchronization of the readings with cycles, and it is simple to combine the results based on the time stamps. Otherwise, it has to be performed based on the relative arrival times of different readings.

However, the equalization of the observation from multiple readers is a more challenging task. Such equalization process may include truncation of a part of the readings at the beginning or end of the activation sequence for each antenna, normalization of the readings based on the number of full cycles and fraction of the cycles, normalization of the readings from an antenna based on whether this antenna is part of a partial cycle (such as an incomplete last cycle), etc. In order to facilitate the equalization process, all the readings may be gathered in a single processing unit.

Figure 4:
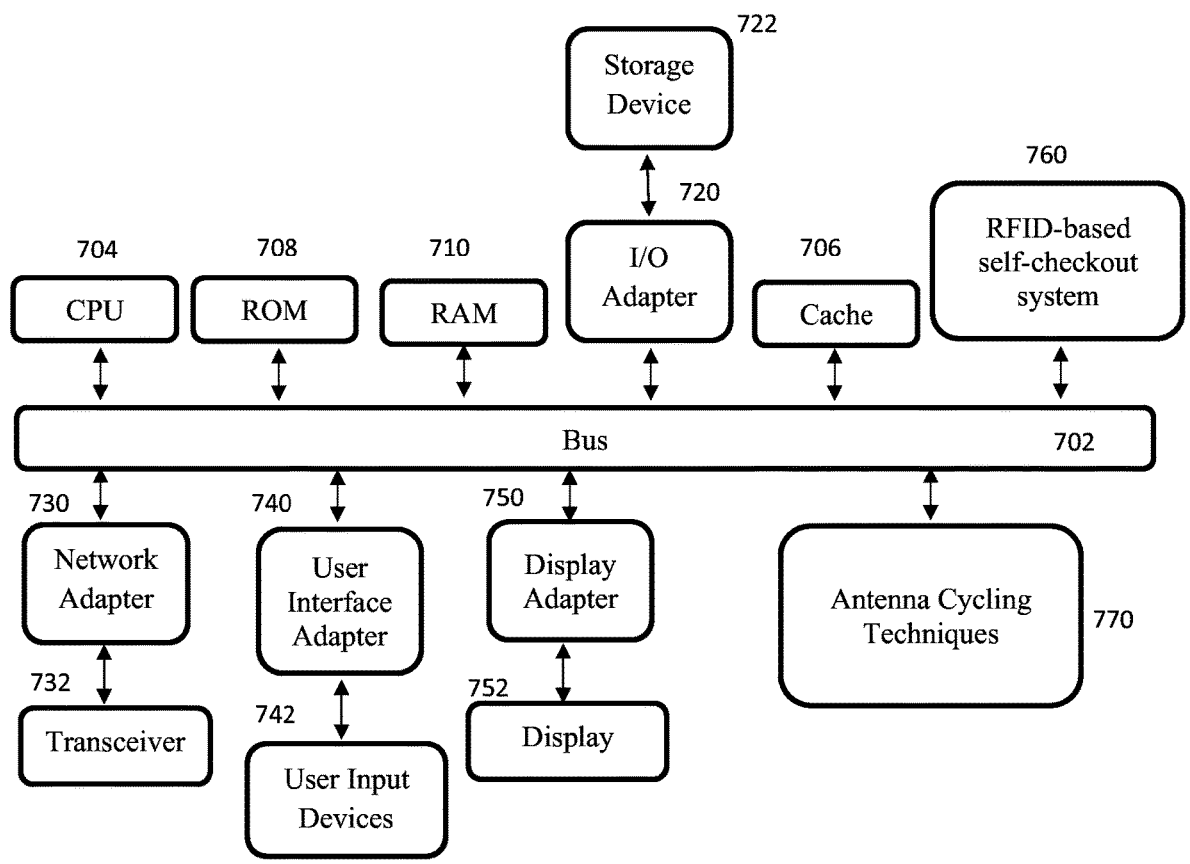
FIG. 4 is a block/flow diagram of an exemplary processing system where the WTG communicates with a network, in accordance with embodiments of the present invention.

FIG. 4 is a block/flow diagram of an exemplary processing system where the WTG communicates with a network, in accordance with embodiments of the present invention.

The processing system includes at least one processor or processor device (CPU) 704 operatively coupled to other components via a system bus 702. A cache 706, a Read Only Memory (ROM) 708, a Random-Access Memory (RAM) 710, an input/output (I/O) adapter 720, a network adapter 730, a user interface adapter 740, and a display adapter 750, are operatively coupled to the system bus 702. The RFID-based self-checkout system 760 can be employed via the bus 702. The RFID-based self-checkout system 760 employs antenna cycling techniques 770.

A storage device 722 is operatively coupled to system bus 702 by the I/O adapter 720. The storage device 722 can be any of a disk storage device (e.g., a magnetic or optical disk storage device), a solid-state magnetic device, and so forth.

A transceiver 732 is operatively coupled to system bus 702 by network adapter 730.

User input devices 742 are operatively coupled to system bus 702 by user interface adapter 740. The user input devices 742 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 742 can be the same type of user input device or different types of user input devices. The user input devices 742 are used to input and output information to and from the processing system.

A display device 752 is operatively coupled to system bus 702 by display adapter 750.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 5:
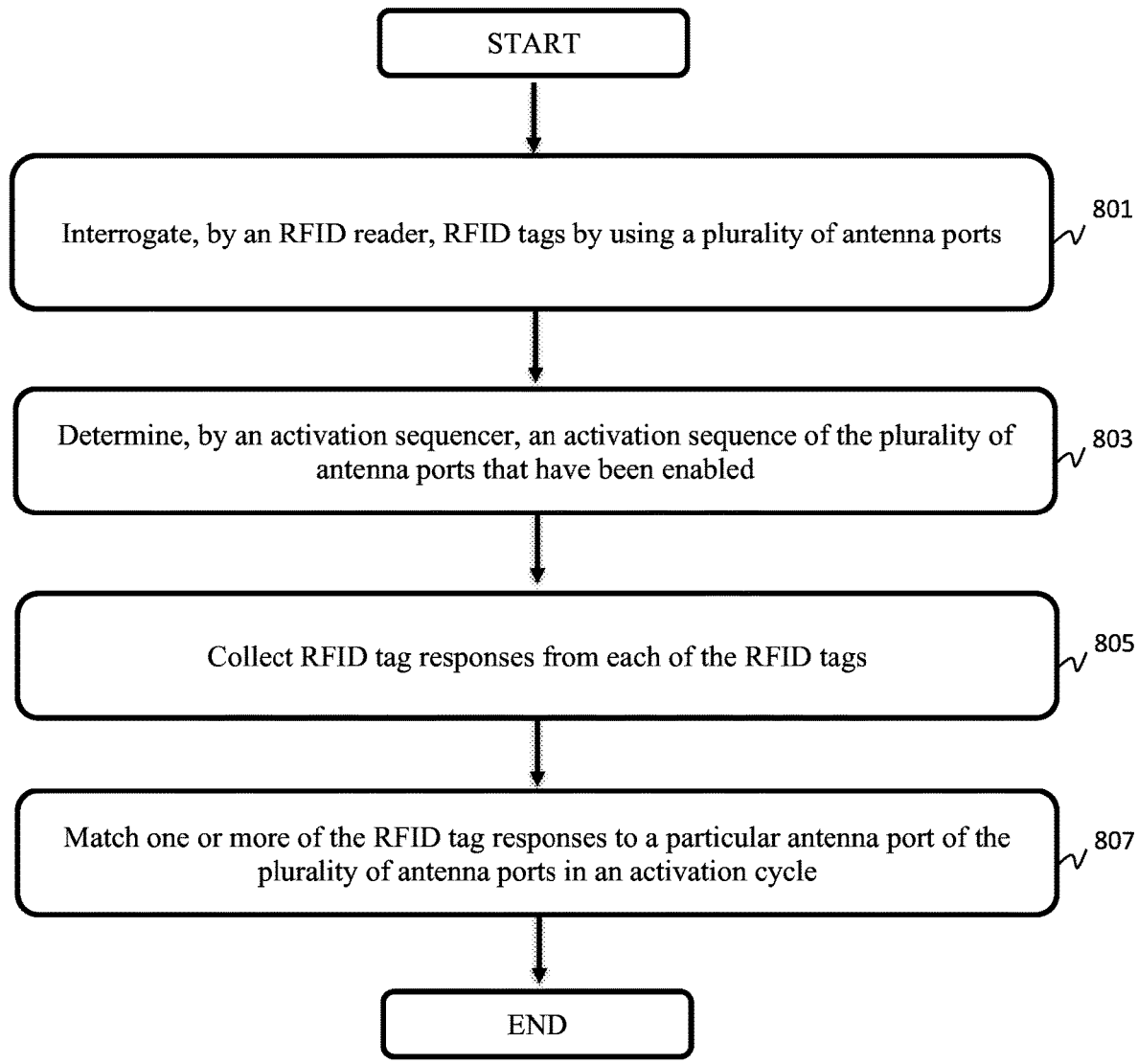
FIG. 5 is a block/flow diagram of an exemplary method for employing an RFID-based self-checkout system using cycle counting, in accordance with embodiments of the present invention.

FIG. 5 is a block/flow diagram of an exemplary method for employing an RFID-based self-checkout system using cycle counting, in accordance with embodiments of the present invention.

At block 801, interrogate, by an RFID reader, RFID tags by using a plurality of antenna ports.

At block 803, determine, by an activation sequencer, an activation sequence of the plurality of antenna ports that have been enabled.

At block 805, collect RFID tag responses from each of the RFID tags.

At block 807, match one or more of the RFID tag responses to a particular antenna port of the plurality of antenna ports in an activation cycle.

Figure 6:
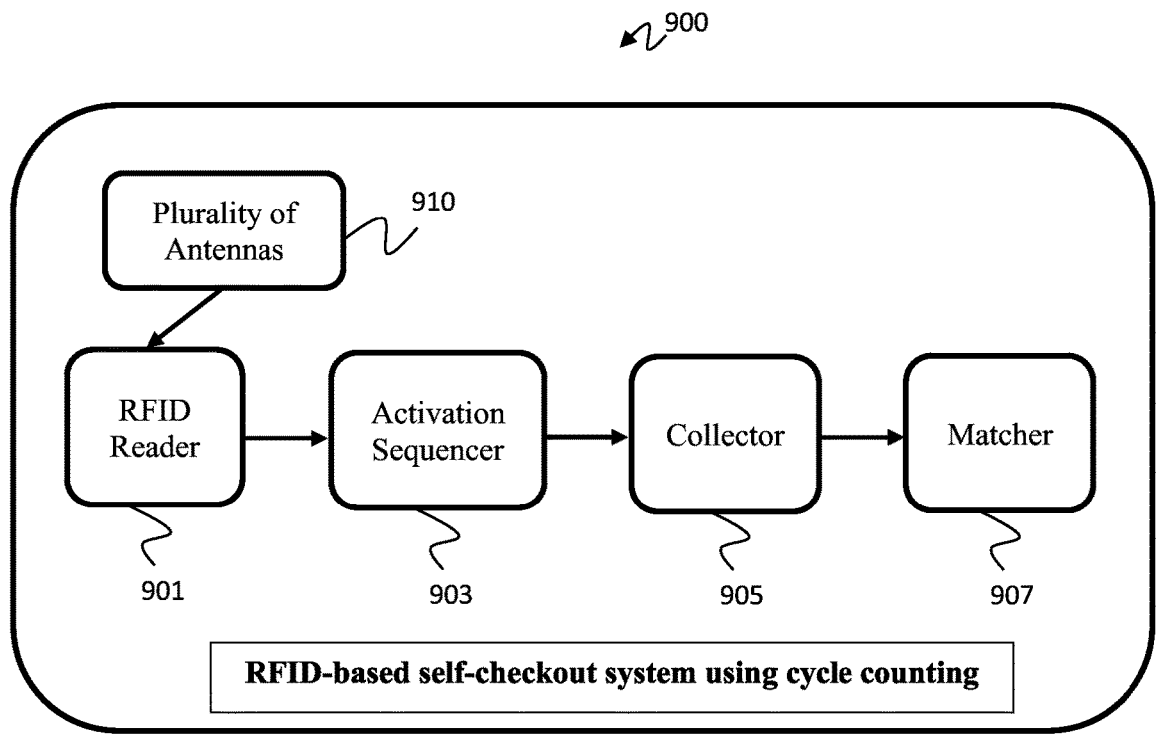
FIG. 6 is a block/flow diagram of an exemplary RFID-based self-checkout system using cycle counting, in accordance with embodiments of the present invention.
Figure 6:
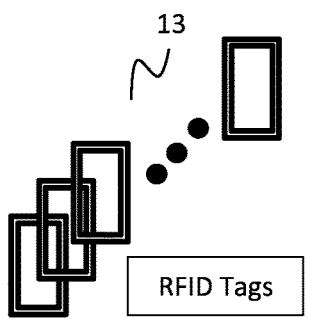

FIG. 6 is a block/flow diagram of an exemplary RFID-based self-checkout system using cycle counting, in accordance with embodiments of the present invention.

The RFID-based self-checkout system 900 includes an RFID reader 901 for reading RFID tags 13 via a plurality of antennas 910. An activation sequencer 903 determines an activation sequence of the plurality of antennas 910 that have been enabled. A collector 905 collects RFID tag responses from each of the RFID tags 13 and a matcher 907 matches one or more of the RFID tag responses to a particular antenna of the plurality of antennas 910 in an activation cycle. The system skips an antenna of the plurality of antenna 910 without activation within the activation cycle. The activation sequence is repeated in cycles and each of the RFID tag responses is associated with a particular cycle. Moreover, interrogation in a given set of full cycles is used by the system 900 to classify each of the RFID tags 13. The interrogation stops after detection of a given number of full cycles. As noted above, the activation cycle is a primal sequence defined as a sequence in which an antenna is not repeated in one cycle and the activation sequence in each cycle is a random permutation of the primal sequence. As a result, the RFID tag responses are used to associate an RFID tag response to an antenna port in the activation sequence.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A radio frequency identification (RFID)-based self-checkout system using cycle counting, the system comprising:
    a walk-way between a first wall and a second wall defining a walk through gate (WTG) for a checkout process in a retail store, the first wall including an entrance sensor disposed on an outer surface of the first wall at an entrance area of the WTG and an exit sensor disposed on an inner surface of the first wall at an exit area of the WTG;
    an RFID reader disposed on the inner surface of the first wall to interrogate RFID tags within the WTG by using a plurality of antenna polls positioned on inner surfaces, outer surfaces, and side surfaces of the first and second walls;
    an activation sequencer to determine an activation sequence of the plurality of antenna ports positioned on the inner surfaces of the first and second walls that have been enabled;
    a collector to collect RFID tag responses from each of the RFID tags within the WTG; and
    a matcher to match one or more of the RFID tag responses to a particular antenna port of the plurality of antenna ports in an activation cycle, and
    indicator lamps disposed on top of the first wall and the second wall closer to the exit area to indicate whether the WTG is in-session for the cycle counting,
    wherein all the received RFID tag responses from all of the plurality of antenna ports are considered to perform the cycle counting of the checkout process.

2. The RFID-based self-checkout system of claim 1, wherein the RFID reader realizes simultaneous reception of a tag's response from multiple antenna ports of the plurality of antenna ports equipped with their own RF chains that are synchronized at a carrier level.

3. The RFID-based self-checkout system of claim 1, wherein the cycle counting indicates knowing where a reading lies with respect to the activation sequence when the activation sequence is known.

4. The RFID-based self-checkout system of claim 1, wherein the activation sequence is repeated in cycles.

5. The RFID-based self-checkout system of claim 4, wherein interrogation in a given set of full cycles is used by the system to classify each of the RFID tags based on the RFID tag responses.

6. The RFID-based self-checkout system of claim 4, wherein interrogation stops after detection of a given number of full cycles.

7. The RFID-based self-checkout system of claim 3, wherein the activation cycle is a primal sequence defined as a sequence in which an antenna port is not repeated in one cycle.

8. The RFID-based self-checkout system of claim 7, wherein the activation sequence in each cycle is a random permutation of the primal sequence.

9. The RFID-based self-checkout system of claim 1, wherein the RFID tag responses are normalized by giving each of the plurality of antenna ports an equal opportunity in sampling their respective share of space.

10. The RFID-based self-checkout system of claim 1, wherein simultaneous reception of an RFID tag response from multiple antenna ports of the plurality of antenna ports occurs and wherein a decoded RFID tag response by the plurality of antenna ports is used to associate the RFID tag response to the antenna port in the activation sequence.

11. The RFID-based self-checkout system of claim 1, wherein the activation sequence and a number of cycles are controlled by the system.

12. The RFID-based self-checkout system of claim 1, wherein the plurality of antenna ports are enabled such that they have proportional fair opportunities in exciting the RFID tags that are in a read range of corresponding antenna ports.

13. The RFID-based self-checkout system of claim 1, wherein beamforming is employed by using an antenna array and wherein an antenna port of the plurality of antenna ports is electrically connected to the antenna array using one or more beamforming coefficients.

14. A method for employing cycle counting for a radio frequency identification (RFID)-based self-checkout system, the method comprising:
    providing a walk-way between a first wall and a second wall defining a walk through gate (WTG) for a checkout process in a retail store, the first wall including an entrance sensor disposed on an outer surface of the first wall at an entrance area of the WTG and an exit sensor disposed on an inner surface of the first wall at an exit area of the WTG;
    interrogating, by an RFID reader disposed on the inner surface of the first wall, RFID tags within the WTG by using a plurality of antenna ports positioned on inner surfaces, outer surfaces, and side surfaces of the first and second walls;
    determining, by an activation sequencer of the RFID-based self-checkout system, an activation sequence of the plurality of antenna polls positioned on inner surfaces of the first and second walls that have been enabled;
    collecting, by a collector of the RFID-based self-checkout system, RFID tag responses from each of the RFID tags within the WTG; and
    matching, by a matcher of the RFID-based self-checkout system, one or more of the RFID tag responses to a particular antenna port of the plurality of antenna ports in an activation cycle, and
    activating, by the RFID-based self-checkout system, indicator lamps disposed on top of the first wall and the second wall closer to the exit area of the WTG, to indicate whether the WTG is in-session for cycle counting,
    wherein all the received RFID tag responses from all of the plurality of antenna ports are considered to perform the cycle counting of the checkout process.

15. The method of claim 14, wherein the activation sequence is repeated in cycles.

16. The method of claim 14, wherein RFID reader realizes simultaneous reception of a tag's response from multiple antenna ports of the plurality of antenna ports equipped with their own RF chains that are synchronized at a carrier level.

17. The method of claim 14, wherein the cycle counting indicates knowing where a reading lies with respect to the activation sequence when the activation sequence is known.

18. The method of claim 14, wherein interrogation stops after detection of a given number of full cycles.

19. The method of claim 15, wherein the activation cycle is a primal sequence defined as a sequence in which an antenna port is not repeated in one cycle.

20. The method of claim 19, wherein the RFID tag responses are normalized by giving each of the plurality of antenna ports an equal opportunity in sampling their respective share of space.

* * * * *